March 19, 1929.  P. SHAPIRO  1,706,001
LUBRICATOR INDICATOR
Filed June 27, 1927
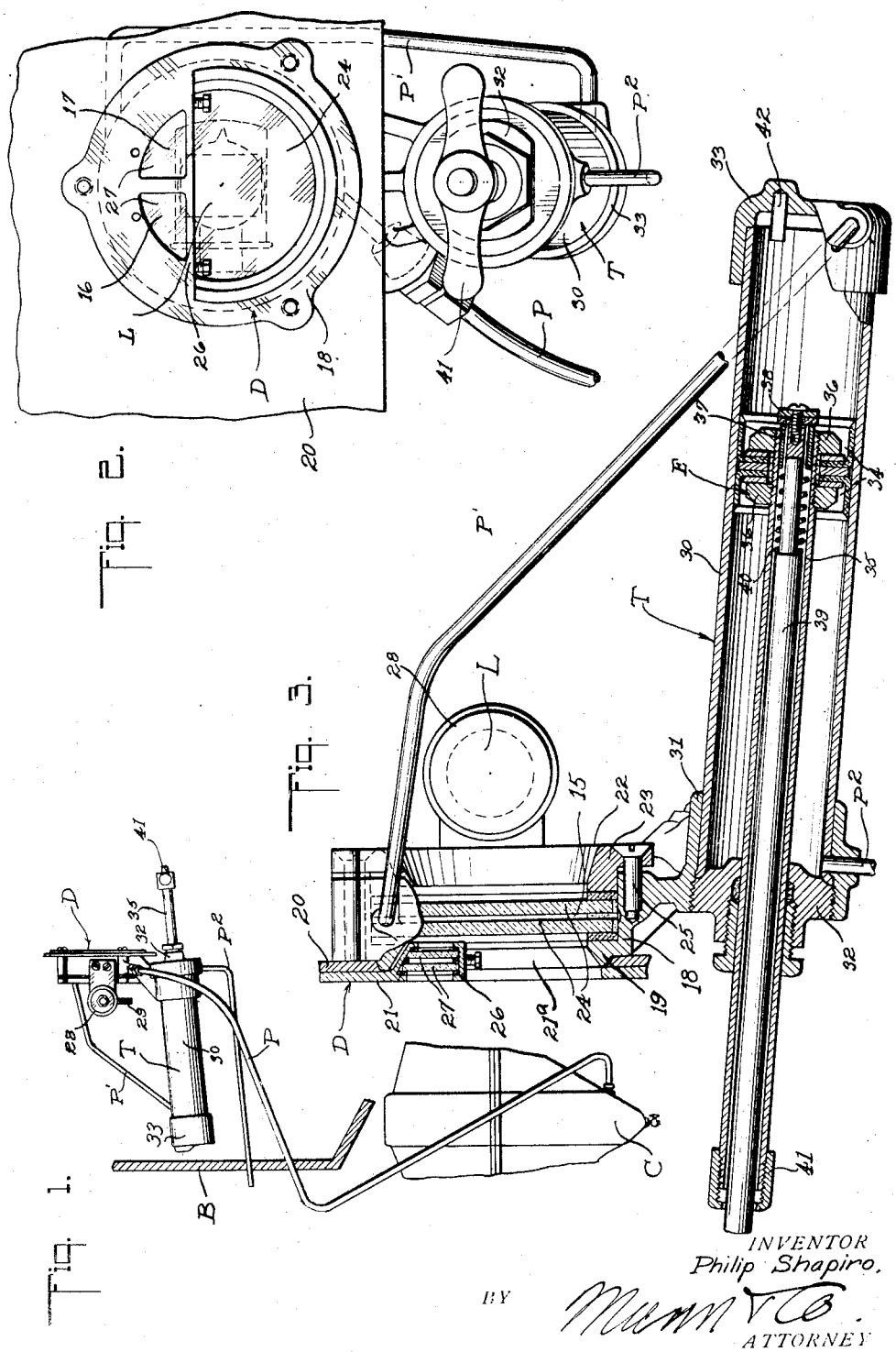

Patented Mar. 19, 1929.

1,706,001

UNITED STATES PATENT OFFICE.

PHILIP SHAPIRO, OF LOS ANGELES, CALIFORNIA.

LUBRICATOR INDICATOR.

Application filed June 27, 1927. Serial No. 201,934.

My invention relates to lubricator indicators of the character embodied in my co-pending application, Serial No. 183,601, filed April 13, 1927, and wherein oil from the crank case of a motor vehicle engine can be elevated into view of the operator of the vehicle by means of a pump and a display device, in such manner that the oil is displayed in a relatively thin and translucent film to allow definite determination of the condition of the oil in the crank case.

It is a purpose of my present invention to simplify the construction and reduce the manufacturing cost of my previous indicator; to render it applicable to all makes of motor vehicles; to simplify its operation to the extent of eliminating a valve and hence the operation thereof, and by creation in the display device of a negative air pressure to produce a siphonic action and thereby elevate oil from the crank case to the display device; and to effect clearing of the display device of all oil so that a true and subsequent test can be made when desired.

I will describe only one form of lubricator indicator embodying my invention, and will then point out the novel features thereof in claims.

In the accompanying drawings:

Figure 1 is a view showing in side elevation one form of lubricator indicator embodying my invention in applied position to a motor vehicle.

Fig. 2 is an enlarged view showing the indicator in front elevation and in applied position to the motor vehicle.

Fig. 3 is a view showing the indicator in side elevation and partly in section.

My invention in its present embodiment essentially consists of a display device designated generally at D, having a main chamber 15 in communication at its bottom with an oil pipe P, which as shown in Fig. 1 extends forwardly through the dashboard B of the vehicle and then downwardly for connection to the crank case C of a motor vehicle engine for conducting oil from the crank case upwardly to the chamber 15. To effect such elevation of oil I provide a manually operable pump, designated generally at T, positioned on the instrument board of the vehicle so as to be readily operable by the operator of the vehicle. The pump communicates with the top of the chamber 15 by the provision of a pipe P¹, and when the pump is operated a negative pressure of air is created in the chamber 15 and the pipe P thereby producing a siphonic action which causes oil from the crank case to flow upwardly through the pipe P into the chamber 15 to be displayed in a relatively thin and translucent film, which is illuminated by a lamp L so that the operator can readily and definitely determine the condition of the oil.

A comparative test of the oil supplied to the chamber 15 can be made by comparison with the quantity of new and unused oil in a chamber 16 of the display device and a quantity of old and used oil in another chamber 17 of the display device, these chambers being positioned with respect to the lamp L so that the oil contained therein is likewise illuminated with the oil in the chamber 15.

The system can be cleared of oil following a testing operation through actuation of the pump T so that the indicator is conditioned for a subsequent operation and test of oil. The manner in which the pump is operated to effect this clearance will be described hereinafter.

The display device D, as illustrated to advantage in Figs. 2 and 3, comprises an annular body 18 having an annular flange 19 disposed within a suitable opening of the instrument board 20 of the vehicle and secured therein by the provision of a cover plate 21, through which latter screws are extended for securing the plate to the front side of the instrument board. At the rear side of the body 18 is a ring 22 having an annular flange 23 extending inwardly of the body and coacting with the flange 19 to secure a pair of glass plates 24 within the body, suitable gaskets being provided for maintaining the plates in spaced relation to the flanges and to each other to provide the relatively narrow chamber 15. The ring 22 is secured to the body by screws 25 applied in the manner illustrated. The cover plate 21 is provided with an opening 21ª which registers with the opening of the annular body 18 in order that the chamber 15 can be viewed by the operator of the vehicle. This plate 21 is provided with an extension 26 containing glass plates 27 associated with each other to provide the oil chambers 16 and 17 in advance and at the top of the chamber 15 so as not to obscure the oil delivered to the chamber 15.

As previously described, the oils contained in the chambers 16 and 17 are illuminated by the lamp L. The lamp L is disposed at the rear of the ring 22 as illustrated in Figs. 1 and 3, and it is provided with a hood 28 which confines projection of the light rays forwardly through the display device in order that a maximum illumination of the films of oil can be effected. This lamp L may be provided with a conventional manually operable switch 29 to control its illumination from a suitable source of current (not shown).

The pump T comprises a barrel 30 supported at its forward end in a bracket 31, which is an extension of the body 18, and secured therein by a plug or head 32 threaded in the bracket in the manner clearly illustrated in Fig. 3. The rear end of the barrel is closed by a head 33 constructed to permit connection of the pipe P¹ thereto for communication with the adjacent end of the barrel 30.

Movable within the barrel is a plunger designated generally at E and which comprises, in the present instance, a pair of cupped leather washers 34 secured on a tubular rod 35 by nuts 36 threaded on the rod. Secured within the rod is a tubular member 37 which constitutes a seat for a valve 38, the latter being secured on the reduced end of a stem 39 movable longitudinally within the rod 35 to open or close the valve 38. A spring 40 is associated with the stem and member 37 to urge the valve 38 to closed position, one end of the stem projecting from the tubular rod to permit manual manipulation thereof to move the valve 38 to open position against the action of the spring 40. The rod 35 is slidable in the head 32 and its outer end is provided with a handle 41 through which the stem 39 protrudes. The air vent pipe P² communicates with the forward end of the barrel 30, and this pipe is extended forwardly and downwardly through the dash-board B, as illustrated in Fig. 1, so that should oil be discharged therefrom in the operation of the pump, it would not soil the floor boards or mat of the vehicle. At the rear end of the barrel a stop pin 42 is secured in the cap 33 to limit the inward movement of the plunger E to the extent of permitting opening movement of the valve 38 when the plunger is at the inner end of the barrel.

In the operation of the indicator, oil from the crank case C can be delivered to the chamber 15 by drawing the rod 35 outwardly thereby moving the plunger forwardly in the barrel and inducing a suction in the chamber 15 and the pipe P. The oil delivered to the chamber 15 is in the form of a relatively thin film, as previously described, which is rendered translucent through illumination by the lamp L.

A comparative test may now be made of the oil's condition by comparison with the oils contained in the chambers 16 and 17.

To clear the system of oil preparatory to a subsequent testing operation, it is only necessary to open the valve 38 by pressing inwardly upon the stem 39 when air from atmosphere will be admitted to the pipe P¹ through the tubular rod 35, thus restoring the normal air pressure in the chamber 15 and thereby causing the oil therein to gravitate back to the crank case through the pipe P. Should a more rapid clearing of the system be desired it may be effected by moving the plunger E inwardly following opening and closing of the valve 38 whereby air in the chamber 15 will be placed under pressure to forcibly eject oil therefrom.

Although I have herein shown and described only one form of lubricator indicator embodying my invention, it is to be understood that various changes and modifications may be made herein without departing from the spirit of the invention and the spirit and scope of the appended claims.

I claim:

1. A device for determining the quality of oil in use in a lubricating system comprising a sight glass for receiving and displaying a specimen of oil, a pump adapted for connection to a crank case to siphon a specimen of oil from the latter and discharge it into the sight glass, and means for placing the pump in communication with atmosphere whereby the sight glass is positively cleared of oil.

2. A device for determining the quality of oil in use in a lubricating system comprising a sight glass for receiving and displaying a specimen of oil, a pump adapted for connection to a crank case to siphon a specimen of oil from the latter and discharge it into the sight glass, when the plunger of the pump is moved in one direction, and means for placing the pump in communication with atmosphere whereby the sight glass is positively cleared of oil.

3. A lubricator indicator comprising an oil conduit adapted for connection with the crank case of an engine for conducting oil upwardly therefrom, a display device for receiving oil from the conduit, and a pump for producing a negative pressure in the display device to siphon oil from the crank case to the device through said conduit, said pump having a plunger provided with a valve normally closed but manually opened to place the device in communication with atmosphere and thereby produces a positive air pressure in the device to allow oil from the latter to drain into the conduit.

4. A lubricator indicator as embodied in claim 3, wherein means is provided for limiting the movement of the plunger in one direction to permit opening of said valve.

5. A device for determining the quality of oil in use in a lubricating system comprising an oil display device adapted for connection to the oil container of an engine, and a pump connected to the display device and operable to create a negative pressure in the device to cause oil from the container to be drawn into the device, said pump including a plunger having a tubular rod, a valve for the plunger normally urged to closed position in respect to the rod, and means for moving the valve to open position.

6. A device for determining the quality of oil in use in a lubricating system comprising an oil display device adapted for connection to the oil container of an engine, and a pump connected to the display device and operable to create a negative pressure in the device to cause oil from the container to be drawn into the device, said pump having a plunger and a tubular rod for actuating the plunger which extends through the latter to place the pump barrel in communication with atmosphere, a valve for closing the inner end of the rod, a stem connected to the valve and disposed within the rod with a portion thereof projecting from the latter, and a spring associated with the stem for normally urging the valve to closed position and yielding to permit opening of the valve upon operation of the stem.

7. A device for determining the quality of oil in use in a lubricating system comprising a slight glass for receiving and displaying a specimen of oil in a relatively thin film to ascertain its quality, a pump adapted to siphon a specimen of oil from the crank case of an engine and discharge it into the sight glass, a member having oil containing chambers adjacent the upper part of the sight glass so as to be visible when oil is delivered to the sight glass, and a lamp at the rear of the sight glass for illuminating oil in the sight glass and in the chambers whereby a comparative test of the oil in the sight glass can be made.

PHILIP SHAPIRO.